May 29, 1945. A. E. JOHNSON 2,377,013
VARIABLE SPEED CONTROL FOR THE TRANSMISSION OF POWER
Filed Feb. 25, 1943 2 Sheets—Sheet 1

INVENTOR
Anton Einar Johnson, deceased
June H. Johnson, Administratrix
for the Estate of Anton Einar Johnson.
By her Attorney.
Harry D. Nilson May 29, 1945.  A. E. JOHNSON  2,377,013
VARIABLE SPEED CONTROL FOR THE TRANSMISSION OF POWER
Filed Feb. 25, 1943  2 Sheets-Sheet 2
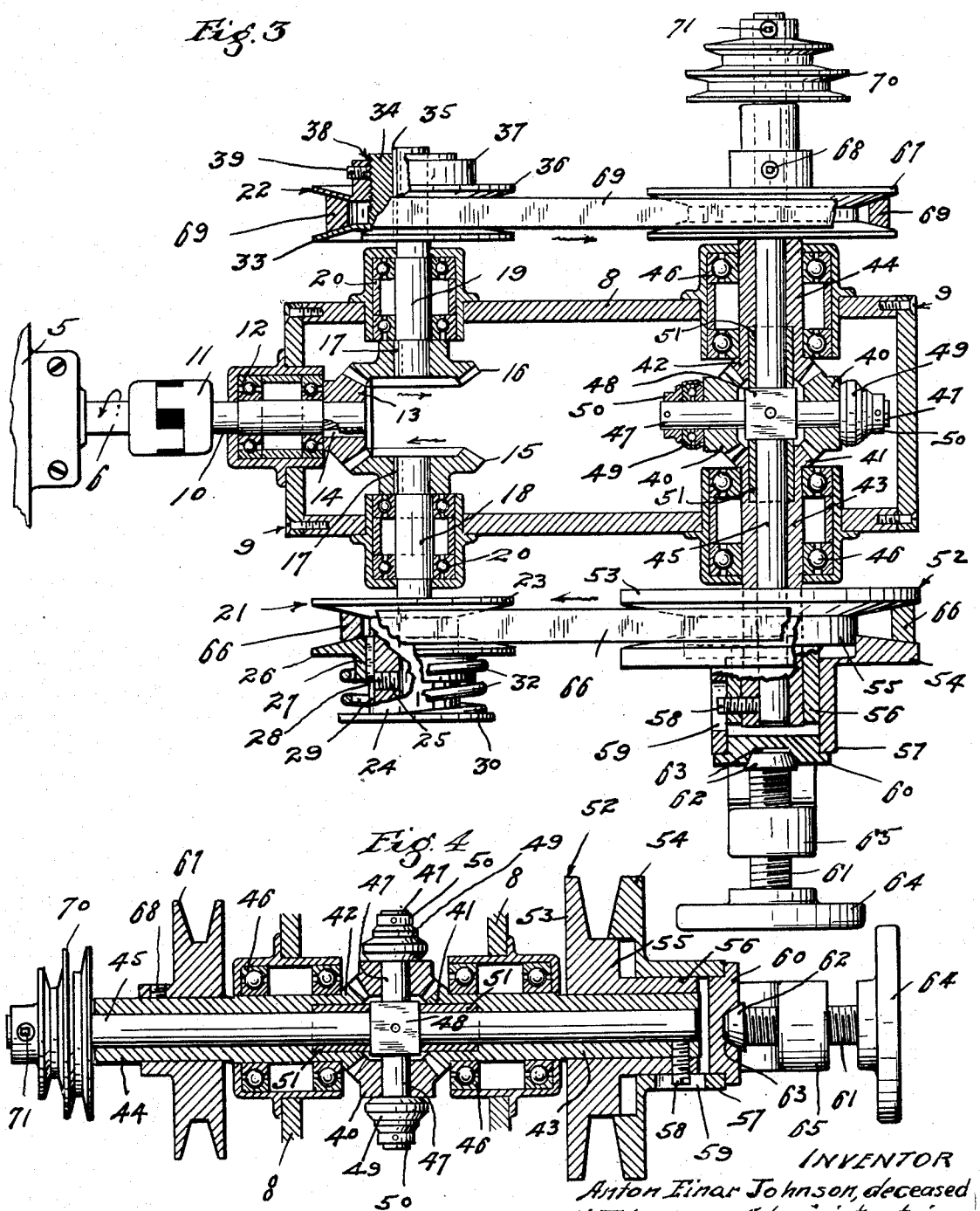
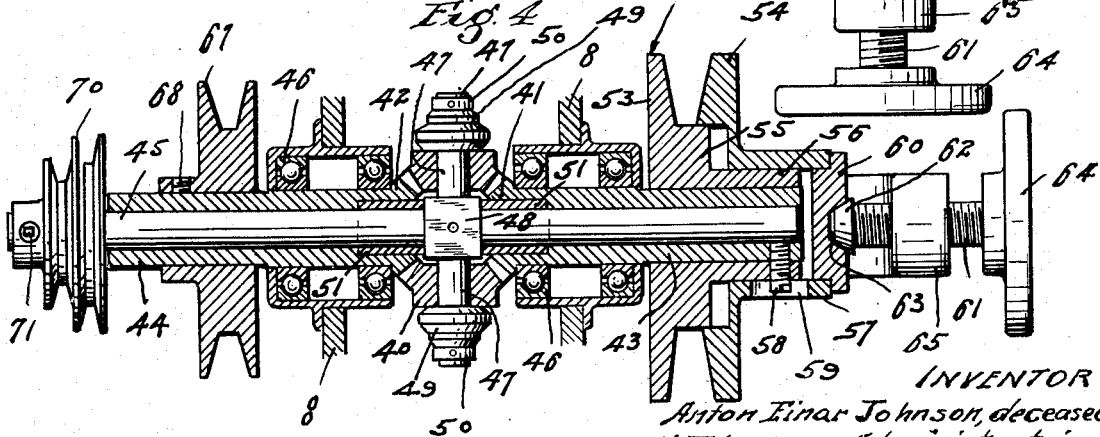
INVENTOR
Anton Einar Johnson, deceased
June H. Johnson, Administratrix
for the Estate of Anton Einar Johnson.
By her Attorney
Harry W. Kilson Patented May 29, 1945

2,377,013

UNITED STATES PATENT OFFICE 2,377,013

VARIABLE-SPEED CONTROL FOR THE TRANSMISSION OF POWER

Anton Einar Johnson, deceased, late of Minneapolis, Minn., by June H. Johnson, administratrix, Minneapolis, Minn., assignor, by mesne assignments, to M. Dysthe, Minneapolis, Minn.

Application February 25, 1943, Serial No. 477,175

2 Claims. (Cl. 74—286)

This invention relates to a variable speed control for the transmission of power and is in the nature of an improvement on the Anton Einar Johnson, United States Letters Patent No. 2,218,712, issued October 22, 1940, and entitled "Variable speed control for the transmission of power."

It is an object of this invention to provide a highly efficient and relatively simple speed control that may be operated to hold its power output member in an idle or neutral position or operated to drive said output member either forward or in reverse from neutral position at a rate of speed that progressively increases.

To the above end the invention consists of the novel devices and combinations of devices hereinafter described and defined in the claims.

In the accompanying drawings, which illustrate the invention, like characters indicate like parts throughout the several views.

Referring to the drawings:

Fig. 3 is a view partly in plan and partly in horizontal section taken on the line 3—3 of Fig. 1; and Fig. 4 is a fragmentary view corresponding to the right hand portion of Fig. 3, but somewhat more in complete section.

Figure 1:
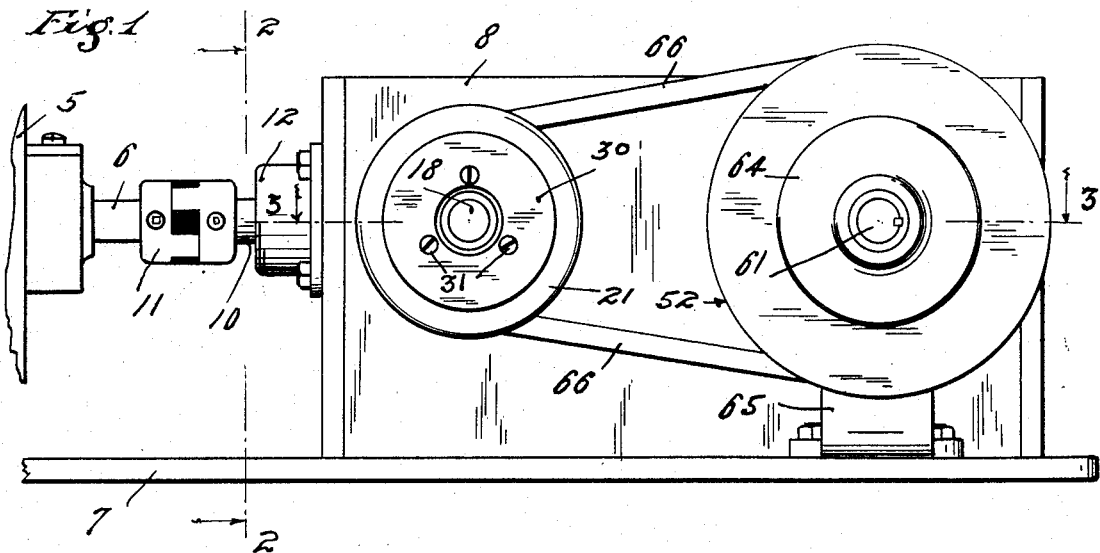
Fig. 1 is a side elevation of the improved speed control.
Figure 2:
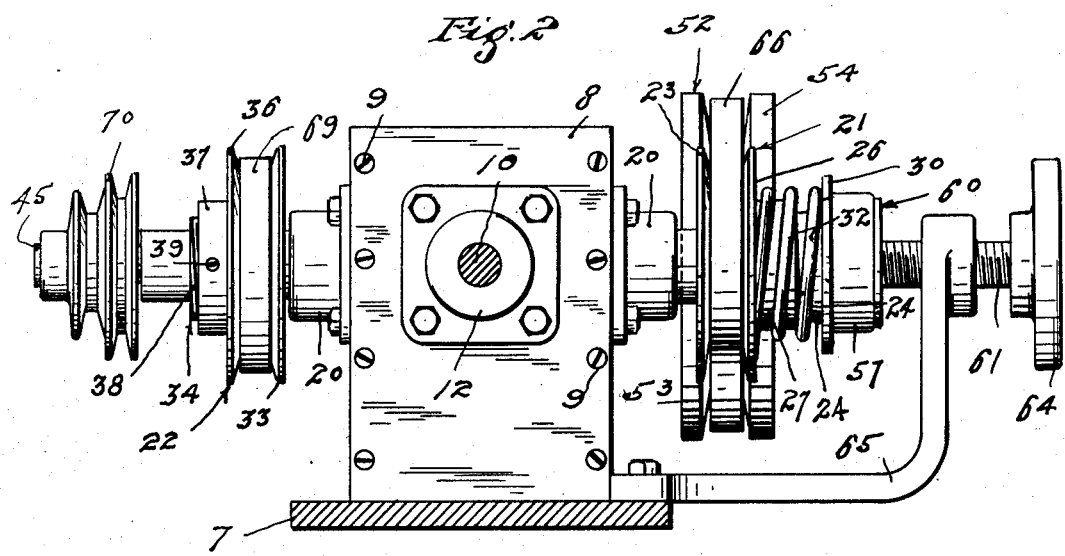
Fig. 2 is a view partly in end elevation and partly in transverse vertical section taken on the line 2—2 of Fig. 1.

The numeral 5 indicates an electric motor, fragmentarily shown as an entirety with the exception of its armature shaft 6 and the numeral 7 indicates a base plate. A rectilinear housing 8 on the base plate 7 and its end members are removable and held in place by screws 9.

The improved speed control includes a driving or power input unit and a driven or output unit.

Referring first to the input unit the numeral 10 indicates a short shaft axially aligned with the armature shaft 6 and connected thereto, at its outer end relative to the housing 8, by a universal joint 11. This shaft 10, at its intermediate portion, is journaled in ball bearings 12 mounted in an aperture in the front end member of the housing 8. A pinion 13 is mounted on the inner end portion of the shaft 10, within the housing 8, and secured thereto by a key 14 for common rotation therewith.

The pinion 13 meshes with a pair of opposing gears 15 and 16 at diametrically opposite points. These gears 15 and 16 are secured by keys 17 to the inner end portions of a pair of oppositely projecting axially aligned shafts 18 and 19, respectively. At their intermediate portions the shafts 18 and 19 are journaled in ball bearings 20 mounted in apertures in the side members of the housing 8. An automatic compensating pulley 21 and a manually adjustable variable speed pulley 22 are mounted on the outer end portions of the shafts 18 and 19, respectively, outwardly of the housing 8. Each pulley 21 and 22 has a single V-shaped groove.

The automatic compensating pulley 21 includes a relatively fixed member 23 having an outwardly projecting hub 24 secured by a set screw 25 to the shaft 18 for common rotation therewith. This compensating pulley further includes a relatively movable member 26 having a hub 27 mounted on the hub 24 for relative sliding movement. A key 28 and cooperating keyway 29 hold the pulley member 26 for common rotation with the pulley member 23 and hence the shaft 18. An abutment 30, in the form of a disk, is secured to the hub 24, at its outer end, by screws 31 and extends radially outwardly of said hub. A coiled spring 32 encircling the hubs 24 and 27 is compressed between the pulley member 26 and the abutment 30 and under strain to slide said pulley member axially toward the pulley member 23.

The variable speed pulley 22 includes a relatively fixed member 33 having an outwardly projecting hub 34 mounted on the shaft 19 and secured thereto by a key 35 for common rotation therewith. This pulley 22 further includes a relatively movable member 36 having an outwardly projecting hub 37 mounted on the hub 34 and connected thereto by screw-threads 38 for axial adjustment toward or from the pulley member 33. A set screw 39 having threaded engagement with the hub 37 impinges against the hub 34 and holds the pulley member 36 when adjusted relative to the pulley member 33.

Referring now to the output unit of the improved speed control the numeral 40 indicates a pair of diametrically opposite differential compensating pinions that mesh with a pair of axially driving pinions 41 and 42. These pinions 41 and 42 having long tubular hubs 43 and 44, respectively, that project outwardly in opposite directions and are turnably mounted on a driven shaft 45. The hubs 43 and 44 are journaled in ball bearings 46 secured in apertures in the side members of the housing 8 and project outwardly thereof. The compensating pinions 40 are loosely journaled on a pair of oppositely axially aligned stub shafts 47 rigidly secured at their inner ends to the shaft 45, as indicated at 48, and project radially therefrom. Thrust bearing 49 for the compensating pinions 40 and 41 are mounted on the stub shafts 47 between the hubs of said pinions and a collar 50 fixed to said shafts. The pinions 41 and 42 and the adjacent end portions of the hubs 43 and 44 are journaled on sleeve bearings 51 on the shaft 45.

A variable speed pulley 52 is mounted on the outer end portion of the hub 43 for common rotation therewith and aligned with the automatic compensating pulley 21. This pulley 52 comprises a relatively fixed member 53 and a relatively movable member 54. The pulley member 53 has a relatively large hub section 56 on which the hub 57 of the pulley member is slidably mounted. A screw 58 secures the pulley 52 to the hub 43 and extends through a slot 59 in the hub 57 and permits the required axial sliding movement of the pulley member 54 relative to the pulley member 53. The hub 57, at its outer end, is closed by a cap 60 and covers the adjacent ends of the hub 43, shaft 45 and hub section 56.

A screw 61 is provided for manually adjusting the pulley member 54 toward the pulley member 53 and for holding the pulley member 54 against axial movement away from the pulley member 53. This screw 61 has on its inner end a truncated conical member 62 which works in a correspondingly formed seat 63 in the cap 60 at the center thereof. A hand wheel 64 is secured to the screw 61 on the outer end thereof. The screw 61 is mounted in and has screw threaded engagement with a hub on a bracket 65 secured to the base plate 7. A V-shaped belt 66 runs over the aligned pulleys 21 and 52.

A pulley 67 having a V-shaped groove is mounted on the hub 44 outwardly of the housing 8 and aligned with the variable speed pulley 22. The pulley 67 is secured to the hub 44 for common rotation therewith by a set screw 68 having threaded engagement with the hub of said pulley and impinges against the hub 44. A V-shaped belt 69 runs over the aligned pulleys 26 and 67 mounted on the shaft 45 outwardly of the hub 44 is a stepped output pulley 70 having V-shaped grooves and secured by a set screw 71 to said shaft for common rotation therewith.

In some instances it might be desirable to mount the electric motor 5 directly on the housing 8 and secure the pinion 13 directly on the armature shaft 6 and thereby do away with the shaft 10 and universal joint 11.

Also in some instances it might be desirable to mount the electric motor directly on the housing 8 with driving connections from the armature shaft 6 to the shaft 10.

While in the drawings the input unit and the output unit are shown in the same horizontal plane they could be mounted the one above the other.

By adjusting the variable speed pulley 52, by means of the hand wheel 64, the travel of the belt 66, relative to the travel of the belt 69, may be adjusted so that said belts drive the oppositely turning pinions 41 and 42 at the same rate of speed and hence no motion is imparted to the shaft 45 and the output pulley 70 is idle or in neutral position. The position of the belt 66 on the pulley 52, when the output pulley 70 is in neutral position may also, for the sake of convenience, be termed neutral position. When the belt 66 is in neutral position the pulley 52 may be adjusted to decrease its diameter and thereby change the ratio of the relative rate of speed at which the pinions 41 and 42 turn and thereby drive the output pulley 70 forwardly. The rate of speed at which the output pulley 70 turns may start from zero and be progressively increased up to top speed. Or by adjusting the pulley 52, when the belt 66 is in neutral position, to increase its diameter the ratio of the relative rate of speed at which the pinions 41 and 42 turn will be changed and thereby drive the output pulley 70 in reverse. When the output pulley 70 is driven in reverse the rate of speed may start from zero and be progressively increased to top reverse speed.

It will be understood that the invention described is capable of various modifications within the scope of the invention herein disclosed and claimed.

What is claimed is:

1. In a device of the class described, a pair of driving shafts, a power input for rotating said shafts in opposite directions, a pulley on each of said shafts, one of which is an automatic compensating V-pulley, a driven power output shaft, a pair of loose pulleys on the driven shaft, one of which is an adjustable variable speed V-pulley aligned with the compensating pulley, reversely acting operating connections including differential compensating elements from the pulleys on the driven shaft to said shaft, a V-belt arranged to run over the aligned compensating and variable speed V-pulleys, a second belt arranged to run over the other two pulleys, said compensating pulley being under strain to move the V-belt outwardly thereon, and means for adjusting the variable speed pulley to move the V-belt outwardly thereon and thereby draw said belt inwardly on the compensating pulley, adjustment of the variable speed pulley to permit the V-belt to move inwardly thereon will permit the automatic compensating pulley to move said belt outwardly thereon and thereby draw said belt inwardly on the variable speed pulley.

2. In a device of the class described, a pair of driving shafts, a power input for rotating said shafts in opposite directions, a pulley on each of said shafts, one of which is an automatic compensating V-pulley comprising relatively fixed and movable members, a driven power output shaft, a pair of loose pulleys on the driven shaft, one of which is an adjustable variable speed V-pulley aligned with the compensating pulley, reversely-acting operating connections including differential elements from the pulleys on the driven shaft to said shaft, a V-belt arranged to run over the aligned compensating and variable speed V-pulleys, a second belt arranged to run over the other two pulleys, yielding means under strain to move the movable member of the compensating pulley toward the fixed member thereof and thereby move the V-belt outwardly on the compensating pulley and draw the same inwardly on the variable speed pulley, and means for moving the movable member of the variable speed pulley toward the fixed member thereof and thereby move the V-belt outwardly on the variable speed pulley and draw the same inwardly on the compensating pulley.

JUNE H. JOHNSON,
*Administratrix of the Estate of Anton Einar Johnson, Deceased.*